United States Patent  
Thompson et al.

(10) Patent No.: US 10,072,494 B2  
(45) Date of Patent: Sep. 11, 2018

(54) REMOTE SENSING USING TRANSDUCER

(71) Applicant: Chevron U.S.A. Inc., San Ramon, CA (US)

(72) Inventors: Melvin Clark Thompson, Los Alamos, NM (US); David William Beck, Santa Fe, NM (US)

(73) Assignee: CHEVRON U.S.A. INC., San Ramon, CA (US)

(*) Notice: Subject to any disclaimer, the term of this patent is extended or adjusted under 35 U.S.C. 154(b) by 252 days.

(21) Appl. No.: 14/950,633

(22) Filed: Nov. 24, 2015

(65) Prior Publication Data

US 2017/0145812 A1 May 25, 2017

(51) Int. Cl.  
E21B 47/06 (2012.01)  
G01L 1/16 (2006.01)

(52) U.S. Cl.  
CPC ............ *E21B 47/06* (2013.01); *E21B 47/065* (2013.01); *G01L 1/16* (2013.01)

(58) Field of Classification Search  
None  
See application file for complete search history.

(56) References Cited

U.S. PATENT DOCUMENTS

| | | | | |
|---|---|---|---|---|
| 2,607,220 A | * | 8/1952 | Martin | E21B 47/06 340/855.3 |
| 3,732,728 A | * | 5/1973 | Fitzpatrick | E21B 47/06 340/854.4 |
| 3,905,010 A | * | 9/1975 | Fitzpatrick | E21B 47/06 340/854.4 |
| 4,075,632 A | * | 2/1978 | Baldwin | A01K 29/005 340/870.01 |
| 4,189,705 A | * | 2/1980 | Pitts, Jr. | E21B 47/123 166/66 |
| 5,263,193 A | * | 11/1993 | Lammers | G01S 7/352 455/315 |
| 5,546,810 A | * | 8/1996 | Arikawa | G01L 9/0022 73/702 |
| 8,106,791 B2 | * | 1/2012 | Thompson | E21B 47/122 340/854.3 |
| 8,390,471 B2 | | 3/2013 | Coates et al. | |
| 9,547,104 B2 | * | 1/2017 | Coates | G01V 11/00 |
| 2008/0062036 A1 | * | 3/2008 | Funk | E21B 29/06 342/22 |

(Continued)

*Primary Examiner* — Jill Culler  
(74) *Attorney, Agent, or Firm* — King & Spalding LLP

(57) ABSTRACT

A system for determining a characteristic of an oil well includes a signal source to generate an excitation signal during a first time duration and to generate a local oscillator signal during a second time duration. The system further includes a directional coupler, and a resonator disposed in an annulus of an oil well to receive the excitation signal through the directional coupler. The system also includes a mixer to receive a resonator signal from the resonator through the directional coupler, to receive the local oscillator signal, and to generate a mixer output signal based on the resonator signal and the local oscillator signal. The system further includes a filter to filter the mixer output signal to produce an intermediate frequency signal having an intermediate frequency, and a processor to determine a pressure or a temperature experienced by the resonator based on the intermediate frequency signal and the excitation signal.

20 Claims, 7 Drawing Sheets

(56) References Cited

U.S. PATENT DOCUMENTS

2011/0267065 A1* 11/2011 Bloys .................... E21B 47/06
  324/337
2013/0257435 A1* 10/2013 Smithson ............ E21B 47/0905
  324/338

* cited by examiner

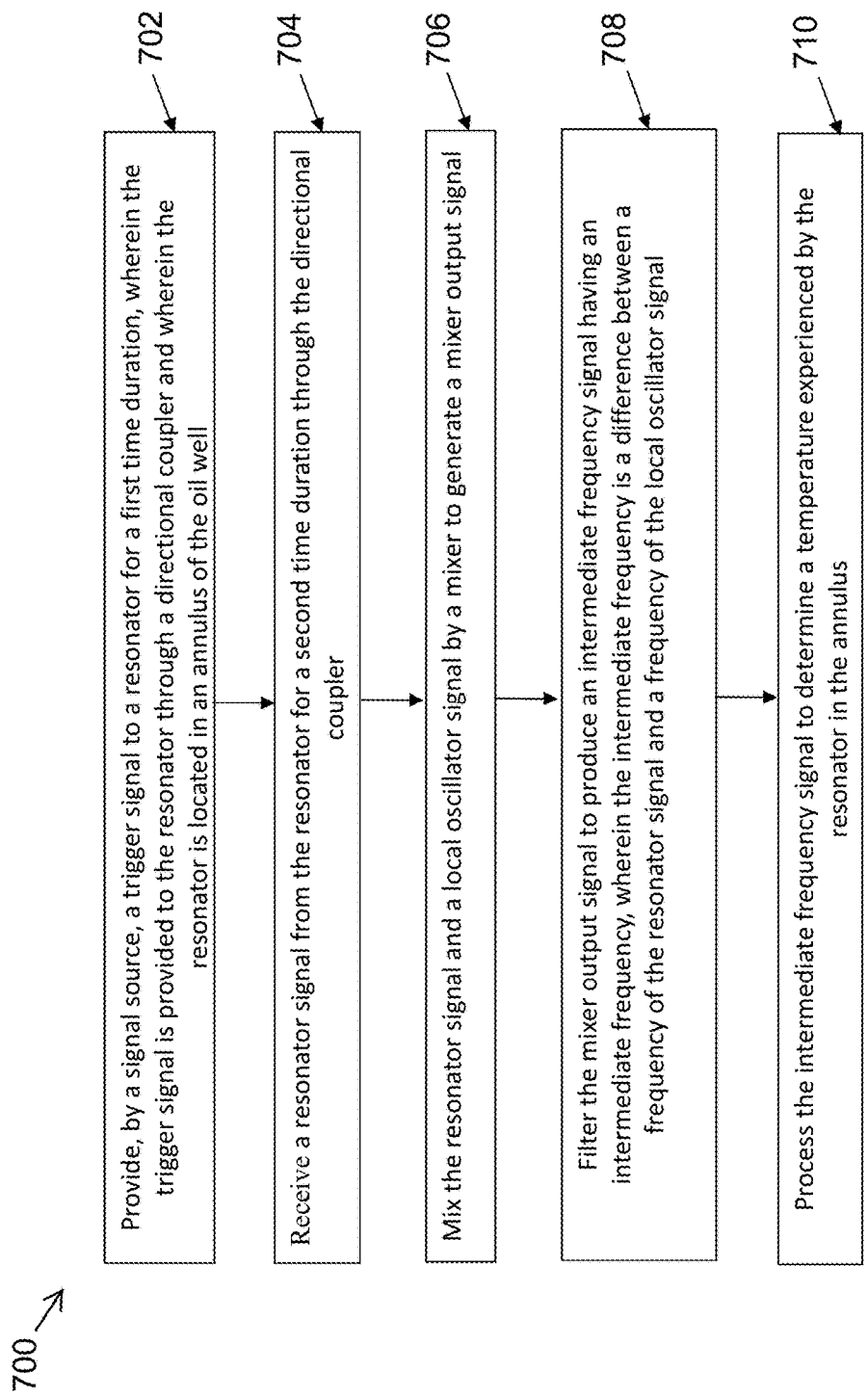

REMOTE SENSING USING TRANSDUCER

TECHNICAL FIELD

The present disclosure relates generally to determining oil well characteristics and more particularly to using a piezoelectric transducer to determine oil well characteristics.

BACKGROUND

Piezoelectric crystalline materials are characterized by the ability to convert mechanical motion into electric charge changes and vise-versa. Such characteristics allow a piezoelectric crystalline material to be used as a transducer to convert mechanical strain/stress (e.g., due to pressure) and/or temperature into changes in the modulation of the material's natural mechanical oscillation frequency. Depending on the angle of the cut of the crystal lattice of a piezoelectric crystalline material from a bulk of the piezoelectric crystalline material, the resulting crystal can transform mechanical force, electrical impedance or temperature to stable changes in the oscillation frequency.

Once the crystal's transfer function is characterized against any of a desired parameter such as pressure and/or temperature, the crystal can make an adequate transducer that oscillates at a frequency reflective of the parameter. Common oscillation frequencies of piezoelectric crystals, for this application, are typically in the band from 1-5 MHz on the basis of generally available crystal sizes and cut. Determining the oscillation frequency of a piezoelectric crystal more accurately provides the ability to more precisely determine a parameter (e.g., a temperature or pressure) effecting the oscillation frequency of the piezoelectric crystal. Thus, reliable means of determining the oscillation frequency of a piezoelectric crystal that is used in the measurement of parameters such as temperature and/or pressure in an oil well is desirable.

SUMMARY

The present disclosure relates generally to determining oil well characteristics and more particularly to using a piezoelectric transducer to determine oil well characteristics. In an example embodiment, a system instrument (located up-hole at ground level) for determining a characteristic of an oil well includes a heterodyne transceiver (a combined transmitter and receiver) for those familiar with the art, that provides a brief transmitted signal as an excitation signal to "ring" the piezoelectric crystal resonator during a first time duration. A second receive time duration, under the processor control, places the instrument in 'receiver' mode to capture the resonator "ring" frequency. The system instrument further includes standard elements of a heterodyne detection device such as a directional coupler, a mixer, an RF oscillator, a low-pass filter and sampling digital signal processor. The system further includes a micro-processor to determine scheduling and timing of the heterodyne components in order to extract a pressure or a temperature experienced by the resonator based on the intermediate frequency signal and the excitation signal.

In another example embodiment, a method for determining a pressure in an oil well includes providing, by a signal source, an excitation signal to a resonator for a first time duration, wherein the resonator is located in an annulus of the oil well. The method further includes receiving a resonator signal from the resonator for a second time duration through the directional coupler and mixing the resonator signal and a local oscillator signal by a mixer to generate a mixer output signal. The method also includes filtering the mixer output signal to produce an intermediate frequency signal having an intermediate frequency, where the intermediate frequency is a difference between a frequency of the resonator signal and a frequency of the local oscillator signal. The method further includes processing the intermediate frequency signal to determine a pressure experienced by the resonator in the annulus.

In another example embodiment, a method for determining a pressure in an oil well includes providing, by a signal source, an excitation signal to a resonator for a first time duration, where the excitation signal is provided to the resonator through a directional coupler and wherein the resonator is located in an annulus of the oil well. The method further includes receiving a resonator signal from the resonator for a second time duration through the directional coupler and mixing the resonator signal and a local oscillator signal by a mixer to generate a mixer output signal. The method also includes filtering the mixer output signal to produce an intermediate frequency signal having an intermediate frequency, where the intermediate frequency is a difference between a frequency of the resonator signal and a frequency of the local oscillator signal. The method further includes processing the intermediate frequency signal to determine a temperature experienced by the resonator in the annulus.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein:

FIG. 7 illustrates a method for determining a temperature in an oil well according to an example embodiment.

Figure 1:
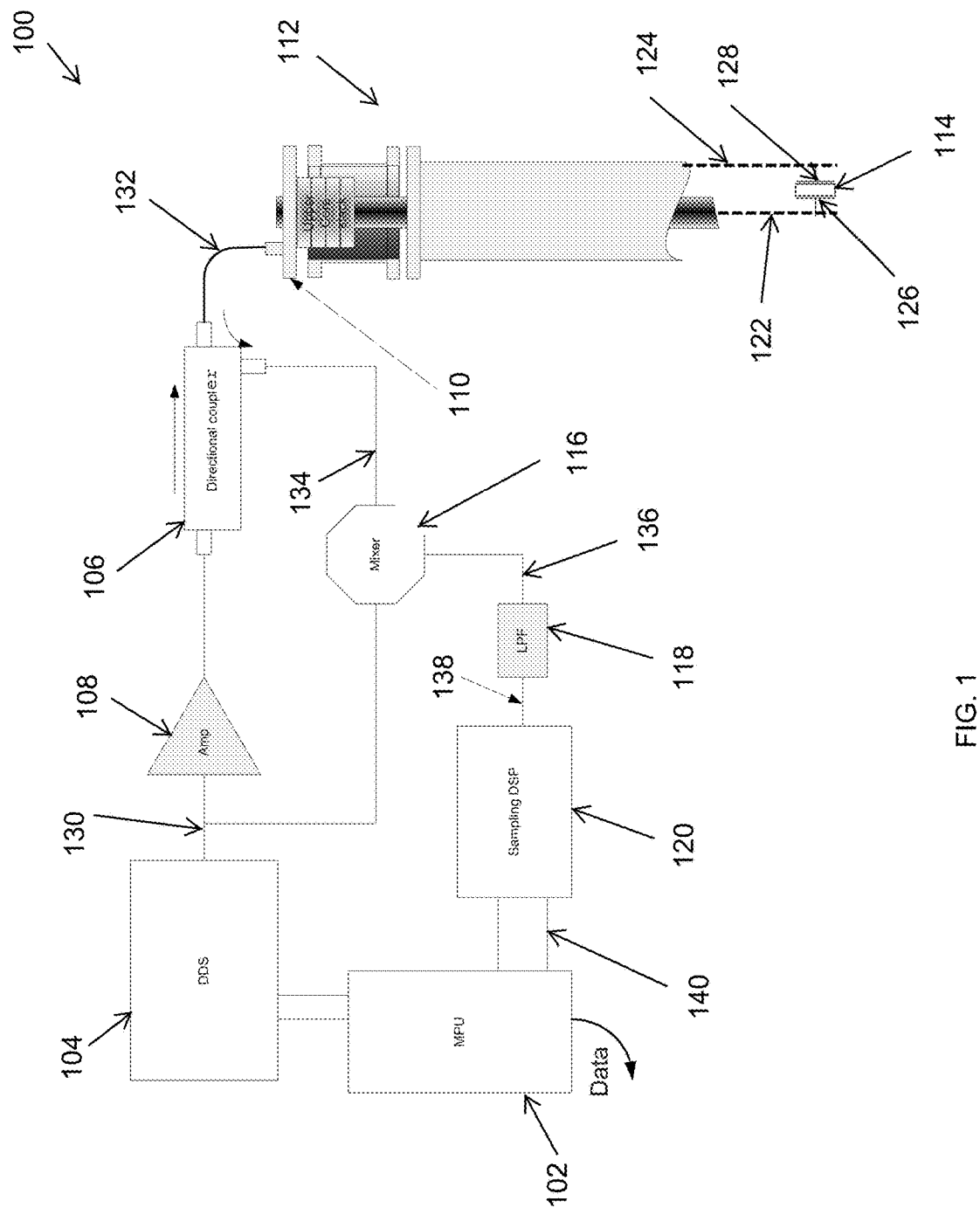
FIG. 1 illustrates a system for determining oil well characteristics such as pressure and temperature according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Turning now to the drawings, FIG. 1 illustrates a system 100 for determining oil well characteristics such as pressure and temperature according to an example embodiment. The system 100 includes a processor 102 and a direct digital synthesizer (DDS) 104. The processor 102 is coupled to the DDS 104 and may control operations of the DDS 104. For example, the processor 102 may control the frequency of a signal generated by the DDS 104 on a connection 130. To illustrate, the DDS 104 may generate an excitation signal during one time duration and a local oscillator signal during another time duration based on a control signal from the processor 102. The DDS 104 may repeatedly generate the excitation signal followed by the local oscillator signal, one after the other, for a respective time duration for each signal based on the control signal from the processor 102.

The frequency of the excitation signal and the local oscillator signal may be controlled by the processor 102. For example, the processor may control DDS 104 such that the DDS 104 changes the frequency of the excitation signal from one time duration to another. As illustrated in FIG. 1, the DDS 104 may generate both the excitation signal and the local oscillator signal on the same connection 130.

In some example embodiments, the system 100 also includes a directional coupler 106. The directional coupler 106 may receive a signal from an amplifier 108 and transfer the signal to a wellhead 110 of a well structure 112 of an oil well via a connection 132. For example, the amplifier 108 may amplify a signal generated by the DDS 104 on the connection 130 and provide the amplified signal to the directional coupler 106. To illustrate, the signal amplified by the amplifier 108 may be the excitation signal generated by the DDS 104.

In some example embodiments, the system includes a resonator 114 that is positioned in the annulus of the oil well between a tubing 122 and a casing 124 of the oil well structure 112. The resonator 114 may include a crystal that has a high Q that allows the resonator 114 to oscillate for a relatively longer time period after an excitation signal provided to the resonator 114 is removed. For example, the resonator 114 may include a quartz, Lithium-niobate, Gallium-nitrate crystal.

As illustrated in FIG. 1, the terminal 126 of the resonator 114 may be coupled to the tubing 122, and another terminal 128 of the resonator 114 may be coupled to the casing 124. To illustrate, the electrical connection 132 may be a coaxial cable, where the terminal 126 of the resonator 114 is coupled to the core of the coaxial cable via the tubing 122, and the terminal 128 of the resonator 114 is coupled to the shield of the coaxial cable via the casing 124. To illustrate, the signal generated by the DDS 104 and amplified by the amplifier 108 may be provided to the resonator 114 through the directional coupler 106 via the connection 132.

In some example embodiments, the system 100 includes a mixer 116 that generates a mixer output signal based on two input signals such that the mixer output signal includes frequency components that are sums and differences of the frequencies of the two input signals. To illustrate, the mixer 116 is coupled to the DDS 104 via the connection 130 and to the directional coupler 106 via a connection 134. The mixer 116 may receive a local oscillator signal from the DDS 104 via the connection 130. The mixer 116 may also receive, through the directional coupler 106, a resonator signal from the resonator 114 via the connection 134. For example, the local oscillator signal may have a local oscillator frequency, $f_1$, and the resonator signal may have another frequency, $f_2$. The mixer 116 may generate a mixer output signal on a connection 136. The mixer output signal may have frequency components $f_1-f_2$ (i.e., $f_1$ minus $f_2$) and $f_1+f_2$ (i.e., $f_1$ plus $f_2$).

In some example embodiments, the system 100 also includes a low pass filter 118 that is coupled to the mixer 116. For example, the low pass filter 118 may receive the mixer output signal on the connection 136 and filter out some frequency components of the mixer output signal. For example, the low-pass filter 118 may reject the $f_1+f_2$ component of the mixer output signal and output an intermediate frequency (IF) signal having a frequency of $f_1-f_2$.

In some example embodiments, the system 100 includes a digital signal processor 120 that is coupled to the low pass filter 118. The digital signal processor 120 may receive the intermediate frequency signal from the low pass filter 118 on a connection 138 and sample the intermediate frequency signal for further processing. For example, the digital signal processor 120 may perform a Fast Fourier Transform (FFT) or similar operations to enable frequency domain analysis of the intermediate frequency signal from the low pass filter 118. To illustrate, the amplitude of the intermediate frequency signal may be determined at the intermediate frequency, $f_1-f_2$, based on the frequency domain representation of the intermediate frequency signal.

Alternatively or in addition, the amplitude of the intermediate frequency signal may be determined at a frequency, $f_0-f_1$, based on the frequency domain representation of the intermediate frequency signal from the low pass filter 118. The frequency, $f_0$, is the frequency of the excitation signal provided to the resonator 114 by the DDS 104 during one time duration before the DDS 104 starts generating the local oscillator signal having the local oscillator frequency, $f_1$, during the following time duration. As described above, the DDS 104 may alternatingly generate the excitation signal and the local oscillator signal on the connection 130 during their respective time durations. The DDS 104 may alternate between generating the excitation signal and the local oscillator signal while maintaining the difference in the frequencies of the two signals substantially constant. For example, the DDS 104 may maintain the frequency difference, $f_0-f_1$, at approximately 10 KHz. The DDS 104 may vary the frequency, $f_0$, of the excitation signal within the oscillation frequency range of the resonator 114 based on characterization of the resonator 114 prior to placing the resonator 114 in the annulus of the oil well structure 112. For example, the frequencies, $f_0$ and $f_1$, may be in a narrower range within the range of, for example, 3 to 5 MHz. The frequency, $f_2$, of the resonator signal from the resonator 114 may also be within the range of, for example, 3 to 5 MHz. Thus, processing the intermediate frequency signal instead of the resonator signal from the resonator 114 allows for higher frequency precision.

Further, the amplitude of the intermediate frequency signal from the low pass filter 118 may be determined at various frequencies including above and below the frequency, $f_0-f_1$, for example, to determine whether the intermediate frequency signal is centered at the frequency, $f_0-f_1$, having a maximum amplitude at the frequency, $f_0-f_1$.

In some example embodiments, the digital signal processor 120 may provide information including amplitude and frequency values of the intermediate frequency signal to the processor 102 via a connection 140. The processor 102 may process the information received from the digital signal processor 120 and determine whether the intermediate frequency signal is centered at the frequency, $f_0-f_1$, and whether the signal has a maximum amplitude at the frequency, $f_0-f_1$. If the processor 102 determines that the intermediate frequency signal is centered at the frequency, $f_0-f_1$, having maximum amplitude at the frequency, $f_0-f_1$, the processor 102 may use the frequency, $f_0$, of the excitation signal to determine a temperature or a pressure experienced by the resonator 114 in the annulus.

To illustrate, prior to placing the resonator 114 in the annulus, the resonator 114 may be characterized to associate different oscillation frequencies of the resonator 114 with different temperature values. For example, during characterization, the resonator 114 may be exposed to a changing temperature while varying, at each value of the changing temperature, the frequency of a signal provided to the resonator 114. In general, the signal provided to the resonator 114 during characterization is equivalent to the excitation signal provided to the resonator 114 by the DDS 104. Indeed, a DDS, such as the DDS 104, may be used provide the varying frequency to the resonator 114 during characterization.

During characterization of the resonator 114, for each temperature value from a range of temperature values, the frequency of the signal provided to the resonator 114 may be varied to determine the frequency (i.e., oscillation frequency) at which the resonator 114 oscillates. For example, the range of temperature values may be based on the temperature that the resonator 114 is expected to experience in the annulus of an oil well. For each particular temperature value in the range of temperature values, the corresponding oscillation frequency of the resonator 114 may be recorded in association with the particular temperature. At the end of the characterization of the resonator for a particular parameter (e.g., temperature, pressure, etc.), a function or a lookup table that allows mapping between frequency of a signal provided to the resonator 114 and the particular parameter may be established for use, for example, by the processor 102. To illustrate, a function or a lookup table may be used to map between the frequency, $f_0$, of the excitation signal provided to the resonator 114 by the DDS 104 and the pressure or temperature experienced by the resonator 114 in the annulus of the oil well structure 112.

Thus, after the processor 102 determines that the intermediate frequency signal from the low pass filter 118 is centered at the frequency, $f_0-f_1$, and has a maximum amplitude at the frequency, $f_0-f_1$, the processor 102 may use a function or a lookup table established during characterization to map the frequency, $f_0$, of the excitation signal to determine a temperature or a pressure experienced by the resonator 114 in the annulus. Because the processor 102 controls the operation of the DDS 104, the processor 102 is aware of the frequency, $f_0$, of the excitation signal that resulted in the intermediate frequency signal centered at the frequency, $f_0-f_1$, and having a maximum amplitude at the frequency, $f_0-f_1$.

During operation of the system 100 to determine a temperature or pressure in an oil well, the DDS 104 may generate the excitation signal having a particular frequency value of the frequency, $f_0$, during a first time duration (e.g., 3 milliseconds (ms)). The particular frequency, $f_0$, value is within a range of oscillation frequencies of the resonator 114 as determined during characterization of the resonator 114. In a second time duration (e.g., 300 ms), the DDS 104 may provide the local oscillator signal having a particular frequency value of the frequency, $f_1$, where the frequency, $f_1$, is, for example, lower than the frequency, $f_0$, by a fixed value (e.g., 10 KHz). The DDS 104 may switch from generating the excitation signal to generating the local oscillator signal in a single clock cycle of excitation signal.

During the second time duration, the processor 102 may process the intermediate frequency signal from the low pass filter 118 as described above to determine whether the intermediate frequency signal is centered at the frequency, $f_0-f_1$, with a maximum amplitude at the frequency, $f_0-f_1$. If the intermediate frequency signal is not centered at the frequency, $f_0-f_1$, with a maximum amplitude at the frequency, $f_0-f_1$, the DDS 104, under the control of the processor 102, may change (e.g., increment) the frequency, $f_0$, of the excitation signal and provide the excitation signal to the resonator 114 for a third time duration. After providing the excitation signal in the third time duration, the DDS 104 may generate the local oscillator signal that has, for example, a lower value of the frequency, $f_1$, than the value of the frequency, $f_0$, by the same fixed (e.g., 10 KHz) value during a fourth time duration.

The processor 102 may process the intermediate frequency signal from the low pass filter 118 as described above to determine whether the intermediate frequency signal resulting from the changed value of the frequency, $f_0$, of the excitation signal is centered at the frequency, $f_0-f_1$, with a maximum amplitude at the frequency, $f_0-f_1$. If that is not the case, the DDS 104 may change the frequency, $f_0$, of the excitation signal in a subsequent time duration followed by another time duration where the DDS 104 generates the local oscillator signal having a value of the frequency, $f_1$, that is less than the changed value of the frequency, $f_0$, of the excitation signal by the same fixed value as prior time durations. The process of generating the excitation signal having a different frequency from prior time durations followed by the local oscillator signal that is offset from the excitation signal by the same amount as prior time durations may continue until the processor 102 determines that the intermediate frequency signal resulting from a particular value of the frequency, $f_0$, of the excitation signal is centered at the frequency, $f_0-f_1$, with a maximum amplitude at the frequency, $f_0-f_1$. The DDS 104 may change the frequency, $f_0$, of the excitation signal by doing increments, decrements, or both within the range of oscillation frequencies of the resonator 114 as determined during characterization of the resonator 114.

In some example embodiments, the processor 102 may perform interpolation based on frequency and temperature or frequency and pressure values stored in the lookup table. For example, the frequency values in the lookup table may have intervals such that the frequency, $f_0$, of the excitation signal that is determined by the processor 102 as indicative of the temperature in the annulus (i.e., the temperature experienced by the resonator 114) may be between two frequency values stored in the lookup table. In such cases, the processor 102 may perform interpolation between the values in the lookup table to determine the temperature that corresponds to the frequency, $f_0$, of the excitation signal. For example, the lookup table may be stored in the processor 102 or in a memory external to the processor 102.

Although the system 100 is described above with respect to an oil well, the system 100 may be used in other structures including other types of wells or other structures unrelated to oil well, where the oil well structure 112 including the wellhead 110 are replaced by other corresponding elements to allow communication between the resonator 114 that is remotely placed from the rest of the system 100. For example, the resonator 114 may be placed in high temperature and/or pressure environments, such as a steam pipe, turbines, reactors, etc., where the system can be used to measure temperatures over 600° F. and pressures over 10,000 pound per square inch (PSI). In some alternative embodiments, one or more of the components of the system 100 (e.g., the amplifier 108) may be omitted or may be integrated with other components of the system 100. Although the connections 130, 134, 136, 138, 140 are shown as single lines, these connections may include one or more electrical wires and/or other connections that are used to carry electrical signals as may be contemplated by those of ordinary skill in the art with the benefit of this disclosure.

Figure 2:
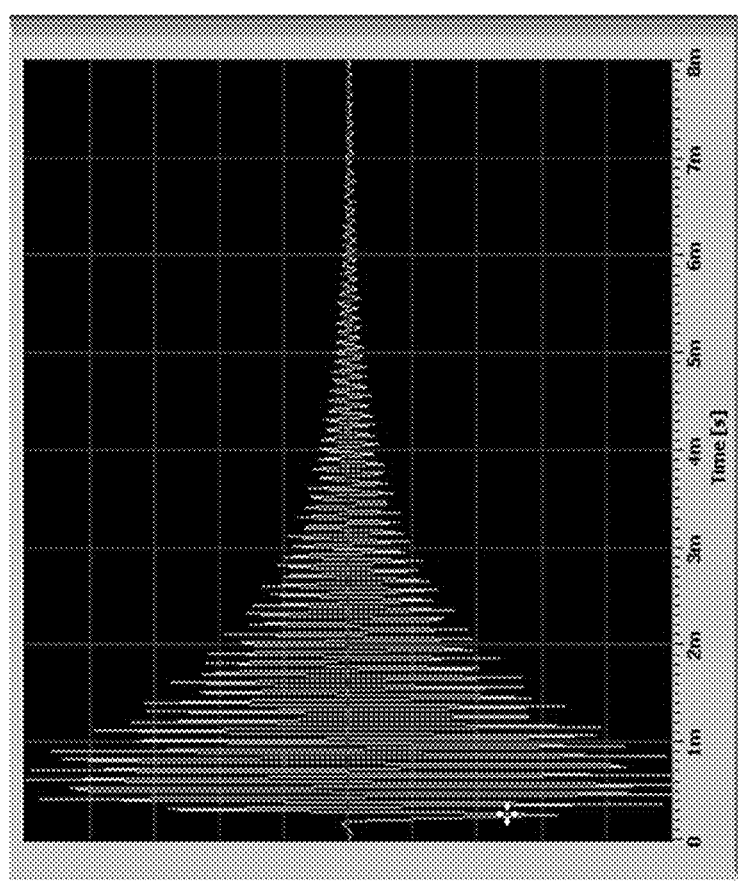
FIG. 2 illustrates a time domain plot of a signal at an output of a low-pass filter of the system of FIG. 1 according to an example embodiment.

FIG. 2 illustrates a time domain plot of an example signal at an output of a low-pass filter of the system of FIG. 1 according to an example embodiment. Referring to FIGS. 1 and 2, the signal shown in FIG. 2 may be the intermediate signal at the connection 138 of FIG. 1. The waveform shows the ringdown amplitude from the resonator lasting about 4-5 ms. The sampling period and rate used by the digital signal processor 120 to sample the intermediate signal may be selected from the information in FIG. 2 for determination of the center frequency of the intermediate signal. The waveform in FIG. 2 shows the pressure or temperature affected oscillation of the resonator 114 after the excitation from the excitation signal generated by the DDS 104 has been removed, ensuring that the frequency of the intermediate signal directly corresponds to the oscillation frequency, $f_2$, of the resonator 114.

Because the frequency, $f_1$, of the local oscillator signal generated by the DDS 104 is selected to be outside of the range of frequencies that could excite the resonator 114, the oscillation frequency, $f_2$, of the resonator 114 is unaffected by the local oscillator signal that may be generated by the DDS 104. Thus, the waveform of FIG. 2 shows the intermediate frequency signal having a stepped down frequency (from the oscillation frequency of the resonator) resulting from heterodyning operation by the mixer 116 and filtering operation by the low pass filter 120, where the intermediate frequency signal is reflective of the temperature or pressure that is sensed by the resonator 114. Statistical analysis (e.g., FFT, etc.) may be applied to the sampled set of data generated from the waveform of FIG. 2 by the digital signal processor 120.

Figure 3:
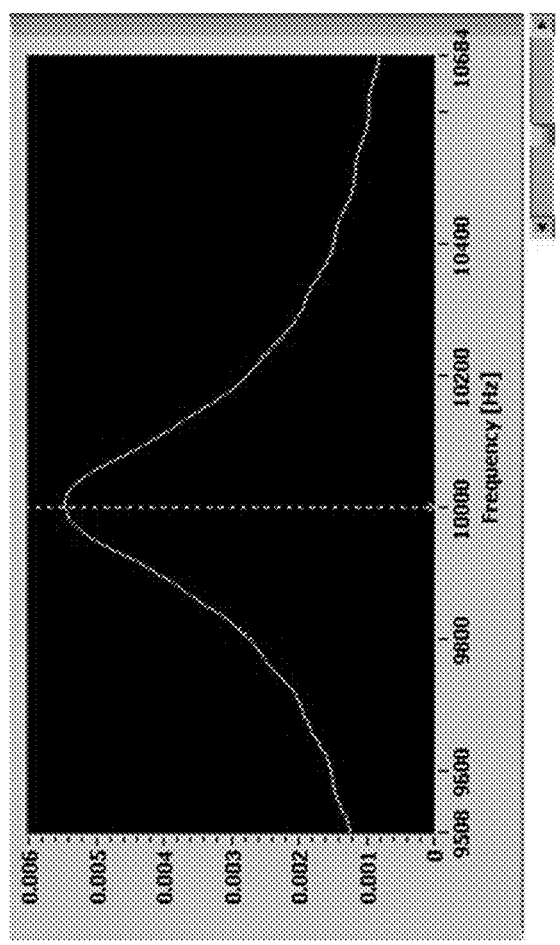
FIG. 3 illustrates a frequency domain plot of the signal shown in FIG. 2 according to an example embodiment.

FIG. 3 illustrates a frequency domain plot of the signal shown in FIG. 2 according to an example embodiment. For example, the plot shown in FIG. 3 may be generated from the Fourier Transform of the signal shown in FIG. 2. To illustrate, the frequency domain waveform is shown centered at 10 KHz with maximum amplitude at 10 KHz. If the difference frequency, $f_0-f_1$, described with respect to FIG. 1 is 10 KHz, the excitation signal provided to the resonator 114 resulting in the intermediate frequency signal shown in FIGS. 2 and 3 is indicative of the temperature or pressure sensed/experienced by the resonator 114 that is remotely located in the annulus of the oil well structure 112 of FIG. 1.

For example, with respect to FIG. 3, if frequency, $f_0$, of the excitation signal is at 3.001230 MHz, the local oscillation frequency, $f_1$, is at 3.011230 MHz, which is 10 KHz higher than the oscillation frequency, $f_2$. With respect to the waveform shown in FIG. 3 where the intermediate frequency signal is centered at 10 KHz having a maximum amplitude at 10 KHz, the oscillation frequency, $f_2$, of the resonator 114 matches the frequency, $f_0$, of the excitation signal. The processor 102 of FIG. 1 may determine from the information in FIG. 3 that 3.001230 MHz is indicative of the pressure or temperature sensed/experienced by the resonator 114 and use a lookup table or a function to map the frequency value, 3.001230 MHz, to a corresponding temperature or pressure value. When using a lookup table, the processor 102 may perform interpolation to determine the corresponding temperature or pressure value if the exact frequency value, 3.001230 MHz, is not in the lookup table. After determining the corresponding temperature or pressure value, the processor 102 may display or otherwise provide the information to a user, another device, or another system, or may perform further processing.

Figure 4:
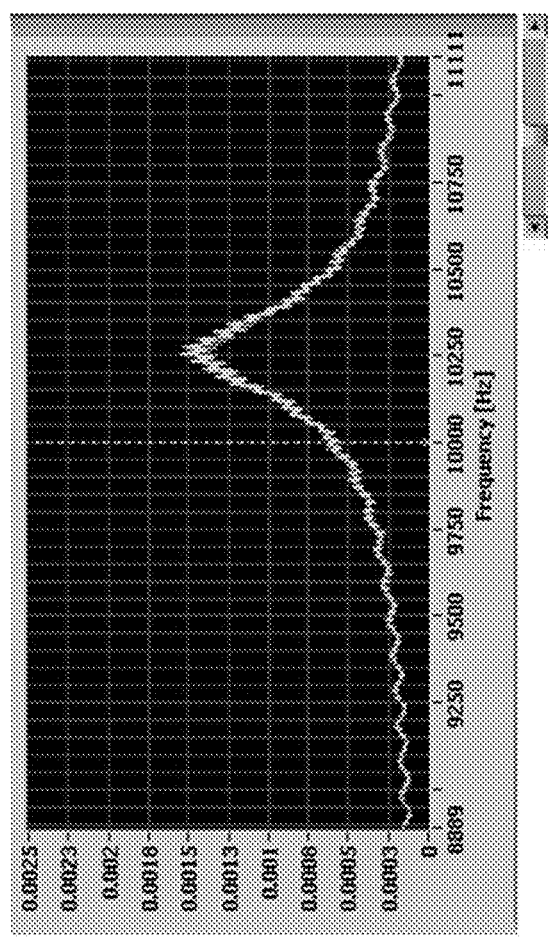
FIG. 4 illustrates a frequency domain plot of the signal at an output of the low-pass filter of the system of FIG. 1 according to another example embodiment.

FIG. 4 illustrates a frequency domain plot of the signal at an output of the low-pass filter of the system of FIG. 1 according to another example embodiment. Referring to FIGS. 1 and 4, if the excitation signal provided to the resonator 114 by the DDS 104 is off the oscillation frequency of the resonator 114 at the particular temperature or pressure sensed/experienced by the resonator 114, the frequency domain waveform of the intermediate signal from the low pass filter 118 may not be centered at the difference frequency, $f_0-f_1$, (i.e., 10 KHz in this case) as shown in FIG. 4. For example, the waveform of FIG. 4 may indicate that the frequency, $f_0$, of the excitation signal is lower than the oscillation frequency, $f_2$, of the resonator 114. The DDS 104, under the control of the processor 102, may increment the frequency, $f_0$, of the excitation signal in a subsequent time duration in response to processing, by the processor 102, the information in the waveform shown in FIG. 4.

Figure 5:
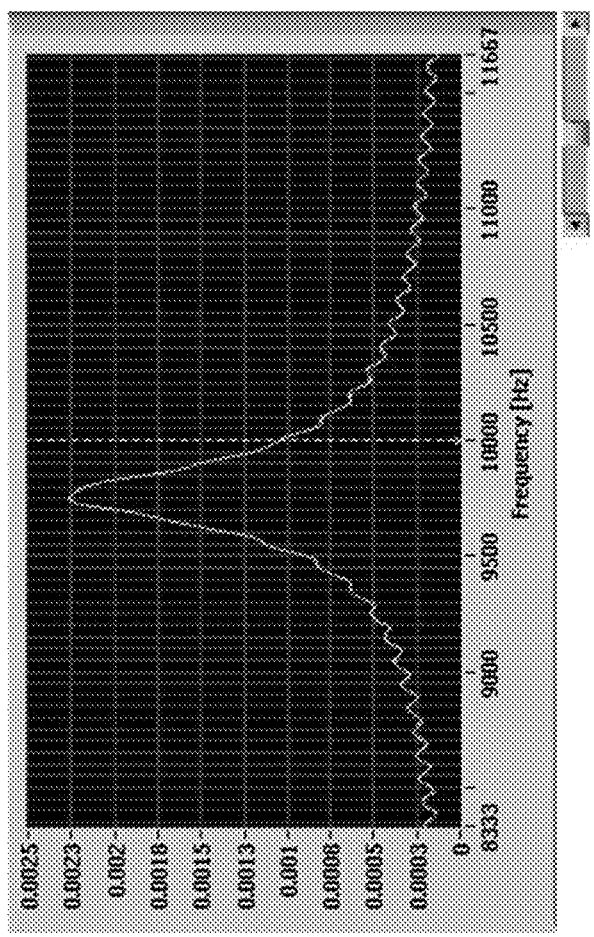
FIG. 5 illustrates a frequency domain plot of the signal at an output of the low-pass filter of the system of FIG. 1 according to another example embodiment.

FIG. 5 illustrates a frequency domain plot of the signal at an output of the low-pass filter of the system of FIG. 1 according to another example embodiment. Referring to FIGS. 1 and 5, if the excitation signal provided to the resonator 114 by the DDS 104 is off the oscillation frequency of the resonator 114 at the particular temperature or pressure sensed/experienced by the resonator 114, the frequency domain waveform of the intermediate signal from the low pass filter 118 may not be centered at the difference frequency, $f_0-f_1$, (i.e., 10 KHz in this case) as shown in FIG. 5. For example, the waveform of FIG. 5 may indicate that the frequency, $f_0$, of the excitation signal is higher than the oscillation frequency, $f_2$, of the resonator 114.

The DDS 104, under the control of the processor 102, may decrement the frequency, $f_0$, of the excitation signal in a subsequent time duration in response to processing, by the processor 102, the information in the waveform shown in FIG. 5. In some example embodiments, the system 100 may continue changing the frequency, $f_0$, of the excitation signal up or down, as needed, until the intermediate frequency signal from the low pass filter 118 is centered at the difference frequency, $f_0-f_1$, (i.e., 10 KHz in this case) as shown in FIG. 1, where the peak of the intermediate frequency signal is at the difference frequency, $f_0-f_1$.

Figure 6:
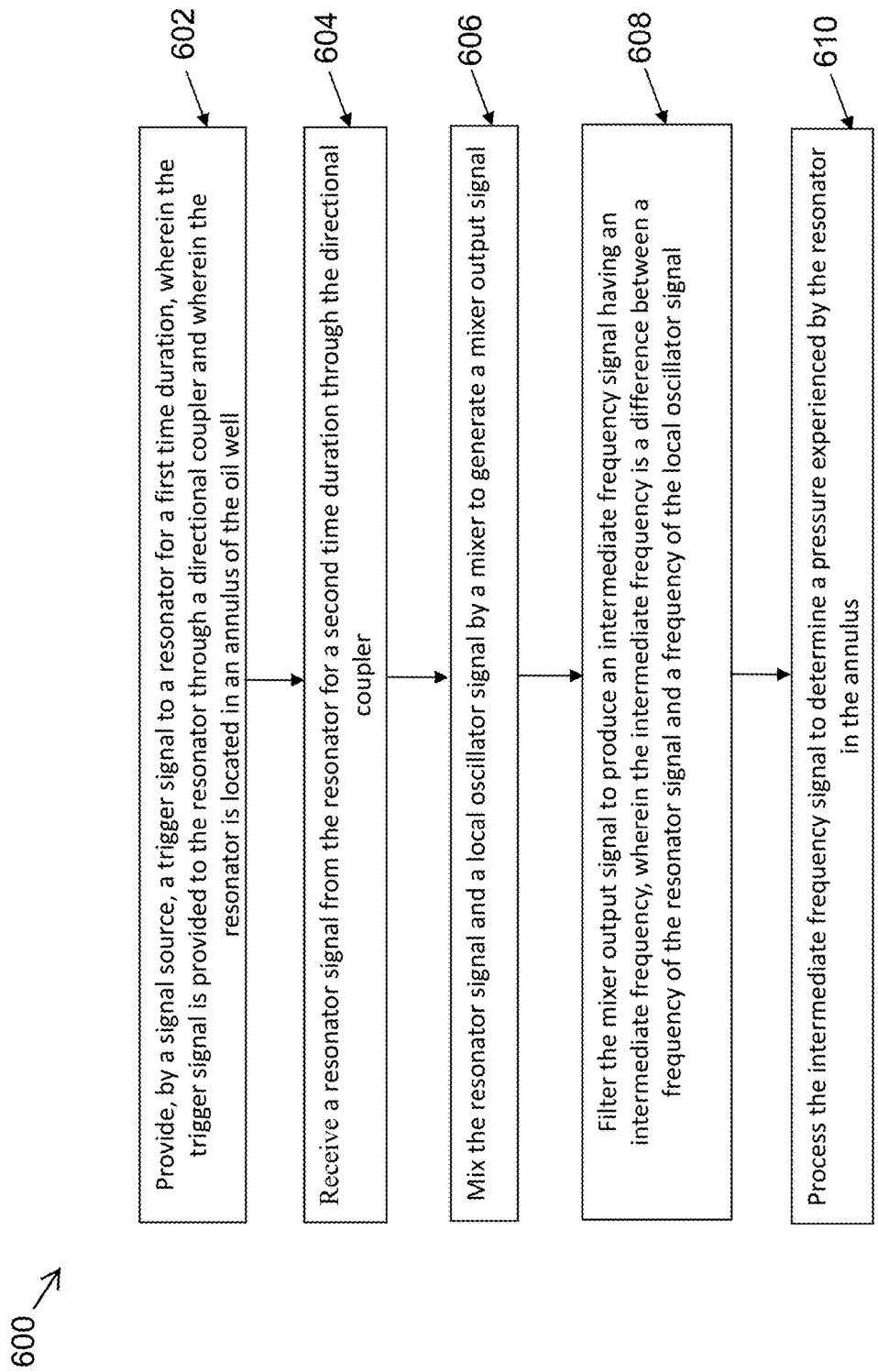
FIG. 6 illustrates a method for determining a pressure in an oil well according to an example embodiment.

FIG. 6 illustrates a method 600 for determining a pressure in an oil well according to an example embodiment. Referring to FIGS. 1 and 6, the method 600 includes, at step 602, providing, by a signal source, a excitation signal to a resonator for a first time duration, wherein the excitation signal is provided to the resonator through a directional coupler and wherein the resonator is located in an annulus of the oil well. For example, DDS 104 may generate the excitation signal on the connection 130. The excitation signal may then be provided to the resonator 114 through the directional coupler 106 via the connection 132 and the structures of the oil well structure 112. In some example embodiments, the excitation signal may be inductively transferred from one component of the oil well structure 112 to another component of the oil well structure 112.

At step 604, the method 600 includes receiving a resonator signal from the resonator for a second time duration through the directional coupler. In general, the first time duration is significantly shorter than the second time duration. For example, the first time duration may be a factor of 100 shorter than the second time duration. As a non-limiting example, the first time duration may be approximately 3 ms while the second time duration is approximately 300 ms. As explained above with respect to FIG. 1, the resonator signal from the resonator 114 may be received via the connection 132 through the direction coupler 106.

At step 606, the method 600 includes mixing the resonator signal and a local oscillator signal by a mixer to generate a mixer output signal. The mixer 116 may perform the mixing of the resonator signal and a local oscillator signal by a mixer to generate a mixer output signal. As explained above with respect to FIG. 1, the local oscillator signal may be generated by DDS 104 on the connection 130 during the second time duration, where the frequency, $f_1$, of the local oscillator signal provided to the mixer 116 is offset (up or down) from the frequency, $f_0$, of the excitation signal (generated in the first time duration) by a fixed value (which may be different from one operation to another) even as the frequency, $f_0$, of the excitation signal changes in subsequent time durations.

At step 608, the method 600 includes filtering the mixer output signal to produce an intermediate frequency signal having an intermediate frequency, wherein the intermediate frequency is a difference between a frequency of the resonator signal and a frequency of the local oscillator signal. To illustrate, because the mixer output signal from the mixer 116 includes frequency components, $f_1-f_2$ and $f_1+f_2$, the low pass filter 118 may reject the $f_1+f_2$ component from the mixer output signal and output the intermediate frequency signal having the lower frequency component, $f_1-f_2$.

At step 610, the method 600 includes processing the intermediate frequency signal to determine a pressure experienced by the resonator in the annulus. As explained above with respect to FIGS. 1-5, the processor 102 may use a function or a lookup table generated from a characterization of the resonator 114 prior to placing the resonator 114 in an oil well to determine the pressure sensed/experienced by the resonator 114. The steps 602-610 may be repeated by changing the frequency, $f_0$, of the excitation signal until the processor 102 determines that a particular value of the frequency, $f_0$, has resulted in the intermediate signal from the low pass filter 110 being centered at the difference frequency, $f_0-f_1$.

Although particular order and steps are shown in FIG. 6, some of the steps may be performed in a different order. Further, in some example embodiments, the method 600 may include steps other than shown in FIG. 6.

FIG. 7 illustrates a method 700 for determining a temperature in an oil well according to an example embodiment. Referring to FIGS. 1 and 7, the method 700 includes, at step 702, providing, by a signal source, an excitation signal to a resonator for a first time duration, wherein the excitation signal is provided to the resonator through a directional coupler and wherein the resonator is located in an annulus of the oil well. For example, DDS 104 may generate the excitation signal on the connection 130. The excitation signal may then be provided to the resonator 114 through the directional coupler 106 via the connection 132 and the structures of the oil well structure 112. In some example embodiments, the excitation signal may be inductively transferred from one component of the oil well structure 112 to another component of the oil well structure 112.

At step 704, the method 700 includes receiving a resonator signal from the resonator for a second time duration through the directional coupler. In general, the first time duration is significantly shorter than the second time duration. For example, the first time duration may be a factor of 100 shorter than the second time duration. As a non-limiting example, the first time duration may be approximately 3 ms while the second time duration is approximately 300 ms. As explained above with respect to FIG. 1, the resonator signal from the resonator 114 may be received via the connection 132 through the directional coupler 106.

At step 706, the method 700 includes mixing the resonator signal and a local oscillator signal by a mixer to generate a mixer output signal. The mixer 116 may perform the mixing of the resonator signal and a local oscillator signal by a mixer to generate a mixer output signal. As explained above with respect to FIG. 1, the local oscillator signal may be generated by DDS 104 on the connection 130 during the second time duration, where the frequency, $f_1$, of the local oscillator signal provided to the mixer 116 is offset (up or down) from the frequency, $f_0$, of the excitation signal (generated in the first time duration) by a fixed value (which may be different from one operation to another) even as the frequency, $f_0$, of the excitation signal changes in subsequent time durations.

At step 708, the method 700 includes filtering the mixer output signal to produce an intermediate frequency signal having an intermediate frequency, wherein the intermediate frequency is a difference between a frequency of the resonator signal and a frequency of the local oscillator signal. To illustrate, because the mixer output signal from the mixer 116 includes frequency components, $f_1-f_2$ and $f_1+f_2$, the low pass filter 118 may reject the $f_{1+2}$ component from the mixer output signal and output the intermediate frequency signal having the lower frequency component, $f_1-f_2$.

At step 710, the method 700 includes processing the intermediate frequency signal to determine a temperature experienced by the resonator in the annulus. As explained above with respect to FIGS. 1-5, the processor 102 may use a function or a lookup table generated from a characterization of the resonator 114 prior to placing the resonator 114 in an oil well to determine the pressure sensed/experienced by the resonator 114. The steps 702-710 may be repeated by changing the frequency, $f_0$, of the excitation signal until the processor 102 determines that a particular value of the frequency, $f_0$, has resulted in the intermediate signal from the low pass filter 110 being centered at the difference frequency, $f_0-f_1$.

Although particular order and steps are shown in FIG. 7, some of the steps may be performed in a different order. Further, in some example embodiments, the method 700 may include steps other than shown in FIG. 7.

Although some embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A system for determining a characteristic of an oil well, the system comprising:
    a signal source to output an excitation signal having an excitation frequency during a first time duration and to output a local oscillator signal having a local oscillator frequency during a second time duration that is different from the first time duration, wherein the signal source outputs the excitation signal and the local oscillator signal on a common output connection;
a directional coupler;
a resonator disposed in an annulus of the oil well to receive the excitation signal through the directional coupler;
a mixer to receive a resonator signal from the resonator through the directional coupler, to receive the local oscillator signal, and to generate a mixer output signal based on the resonator signal and the local oscillator signal;
a filter to filter the mixer output signal to produce an intermediate frequency signal having an intermediate frequency, wherein the intermediate frequency is a difference between a frequency of the resonator signal and the local oscillator frequency; and
a processor coupled to the signal source and that controls generation of the excitation signal and the local oscillator signal by the signal source, wherein the processor determines a pressure or a temperature experienced by the resonator in the annulus of the oil well based on the intermediate frequency signal and the excitation signal.

2. The system of claim 1, wherein the directional coupler is coupled to a wellhead by an electrical connection, wherein a first terminal of the resonator is coupled to a tubing of the oil well, and wherein a second terminal of the resonator is coupled to a casing of the oil well.

3. The system of claim 2, wherein the electrical connection includes a coaxial cable, where the first terminal of the resonator is in electrical communication with a shield of the coaxial cable and wherein the second terminal of the resonator is in electrical communication with a core of the coaxial cable.

4. The system of claim 1, wherein the signal source changes the excitation frequency in iterations of generating the excitation signal during the first time duration and the local oscillator signal during the second time duration.

5. The system of claim 1, wherein the processor uses a lookup table to map a value of the excitation frequency of the excitation signal to a value of the pressure or the temperature, wherein the lookup table is generated by characterizing the resonator based on a characterization pressure or a characterization temperature prior to a placement of the resonator in the annulus of the oil well.

6. The system of claim 1, wherein different values of the frequency of the excitation signal result in different amplitudes of the intermediate frequency signal at the intermediate frequency and wherein the processor compares the different amplitudes of the intermediate frequency signal at the intermediate frequency to determine a value of the excitation frequency that corresponds to the pressure or the temperature.

7. A method for determining a pressure in an oil well, the method comprising:
providing, by a signal source, an excitation signal having an excitation frequency to a resonator for a first time duration, wherein the excitation signal is provided to the resonator through a directional coupler and wherein the resonator is located in an annulus of the oil well;
receiving a resonator signal from the resonator for a second time duration through the directional coupler;
providing, by the signal source, a local oscillator signal having a local oscillator frequency to a mixer during the second time duration that is different from the first time duration, wherein the signal source outputs the excitation signal and the local oscillator signal on a common output connection;
mixing the resonator signal and the local oscillator signal by the mixer to generate a mixer output signal;
filtering the mixer output signal to produce an intermediate frequency signal having an intermediate frequency, wherein the intermediate frequency is a difference between a frequency of the resonator signal and the local oscillator frequency; and
processing the intermediate frequency signal to determine a pressure experienced by the resonator in the annulus.

8. The method of claim 7, further comprising repeating the steps of providing, receiving, mixing, filtering, and processing for different values of the excitation frequency.

9. The method of claim 7, wherein processing the intermediate frequency signal includes determining whether the intermediate frequency signal is centered at a frequency that is a difference between the excitation frequency and the local oscillator frequency.

10. The method of claim 7, wherein processing the intermediate frequency signal includes using a lookup table to map the excitation frequency to a value of the pressure.

11. The method of claim 7, wherein the signal source provides the local oscillator signal to the mixer during the second time duration.

12. The method of claim 7, further comprising characterizing the resonator prior to placing the resonator in the annulus of the oil well to associate oscillation frequencies of the resonator with pressures exerted on the resonator.

13. The method of claim 12, further comprising storing the oscillation frequencies of the resonator and the pressures exerted on the resonator in a lookup table in association with each other based on the characterization of the resonator.

14. A method for determining a temperature in an oil well, the method comprising:
providing, by a signal source, an excitation signal having an excitation frequency to a resonator for a first time duration, wherein the excitation signal is provided to the resonator through a directional coupler and wherein the resonator is located in an annulus of the oil well;
receiving a resonator signal from the resonator for a second time duration through the directional coupler;
providing, by the signal source, a local oscillator signal having a local oscillator frequency to a mixer during the second time duration that is different from the first time duration, wherein the signal source outputs the excitation signal and the local oscillator signal on a common output connection;
mixing the resonator signal and the local oscillator signal by the mixer to generate a mixer output signal;
filtering the mixer output signal to produce an intermediate frequency signal, wherein the intermediate frequency is a difference between a frequency of the resonator signal and the local oscillator frequency; and
processing the intermediate frequency signal to determine a temperature experienced by the resonator in the annulus.

15. The method of claim 14, further comprising repeating the steps of providing, receiving, mixing, filtering, and processing for different values of the excitation frequency.

16. The method of claim 14, wherein processing the intermediate frequency signal includes determining whether the intermediate frequency signal is centered at a frequency that is a difference between the excitation frequency and the local oscillator frequency.

17. The method of claim 14, wherein processing the intermediate frequency signal includes using a lookup table to map the excitation frequency to a value of the temperature.

18. The method of claim 14, wherein the signal source provides the local oscillator signal to the mixer during the second time duration.

19. The method of claim 14, further comprising characterizing the resonator prior to placing the resonator in the annulus of the oil well to associate oscillation frequencies of the resonator with temperatures to which the resonator exposed.

20. The method of claim 19, further comprising storing the oscillation frequencies of the resonator and the temperatures in a lookup table in association with each other based on the characterization of the resonator.

* * * * *